United States Patent [19]
Page et al.

[11] 3,900,092
[45] Aug. 19, 1975

[54] AUTOMATICALLY OPERATED VEHICLE RESTRAINT MECHANISM

[76] Inventors: Frederick Walter Page, 10 Montana Rd., Wimbledon; Peter Charles Darlington Wardle, 12 Hunter Rd., Wimbledon, both of London, S.W.20, England

[22] Filed: Mar. 7, 1974

[21] Appl. No.: 448,891

[30] Foreign Application Priority Data
Mar. 9, 1973 United Kingdom............... 11638/73

[52] U.S. Cl................................................. 194/9 T
[51] Int. Cl.²......................................... G07C 1/30
[58] Field of Search ......... 194/DIG. 22, DIG. 23, 194/DIG 21, 194/9 T

[56] References Cited
UNITED STATES PATENTS
| | | | |
|---|---|---|---|
| 2,588,502 | 3/1952 | Dunn........................... | 194/DIG. 23 |
| 3,503,480 | 3/1970 | Selby, Jr. ..................... | 194/DIG. 22 |
| 3,757,916 | 9/1973 | Selby............................ | 194/DIG. 22 |

*Primary Examiner*—Stanley H. Tollberg

[57] ABSTRACT

An automatically operated vehicle restraint mechanism for use in levying a charge for parking a vehicle in a curbside parking bay, comprising sensing means which may be a buried magnetic loop for sensing a vehicle parked in the bay, vehicle restraint means, which may comprise two extensible posts, movable between an operative position in which movement of the vehicle from the parking bay is restrained solely by the restraint means and regardless of the position of the vehicle in the parking bay and an inoperative position in which the restraint means is preferably positioned below ground level to leave an uninterrupted road surface and in which the vehicle can be moved away from the parking bay and a metering mechanism adapted to time the presence of a vehicle in the parking bay. The sensing means is adapted to initiate movement of the restraint means from the inoperative position into the operative position in response to the presence of a vehicle in the parking bay and the metering mechanism initiates movement of the restraint means from the operative to the inoperative position in response to a signal applied to the metering mechanism.

25 Claims, 5 Drawing Figures

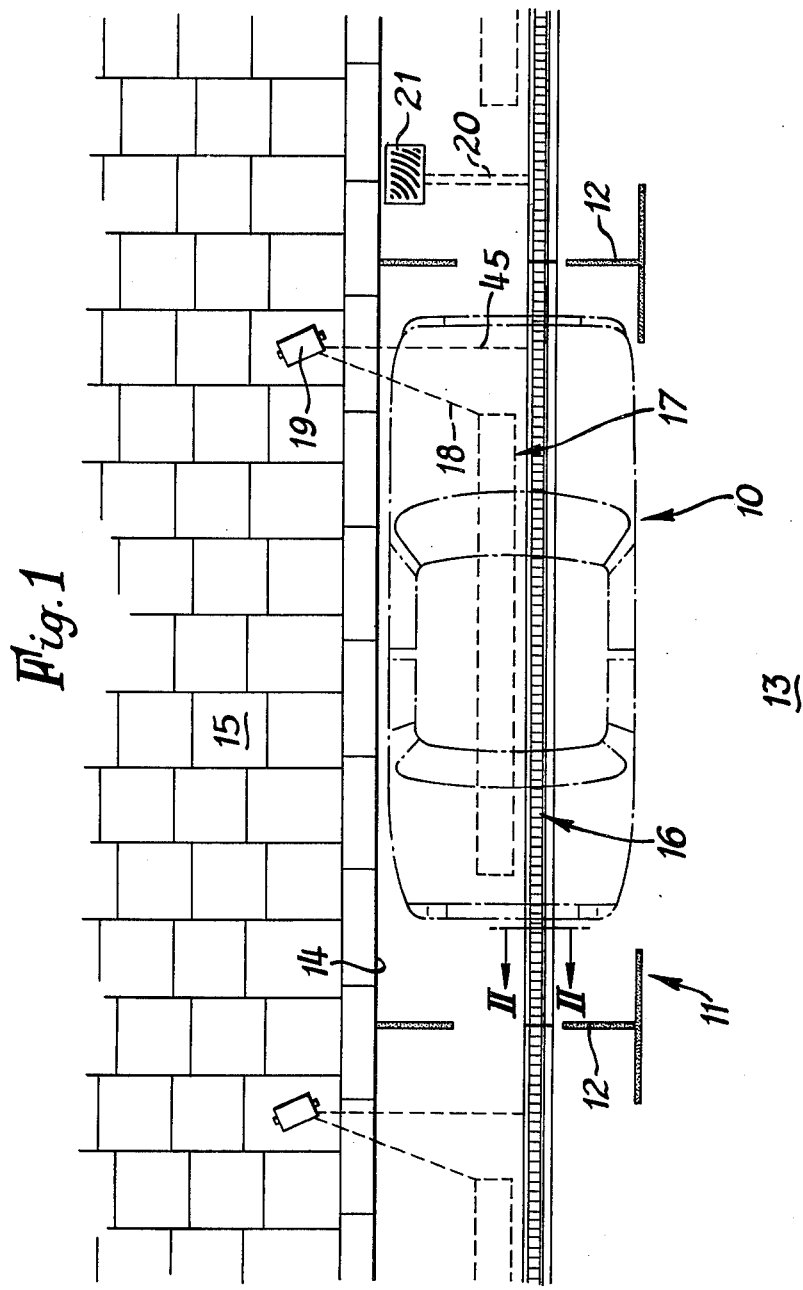

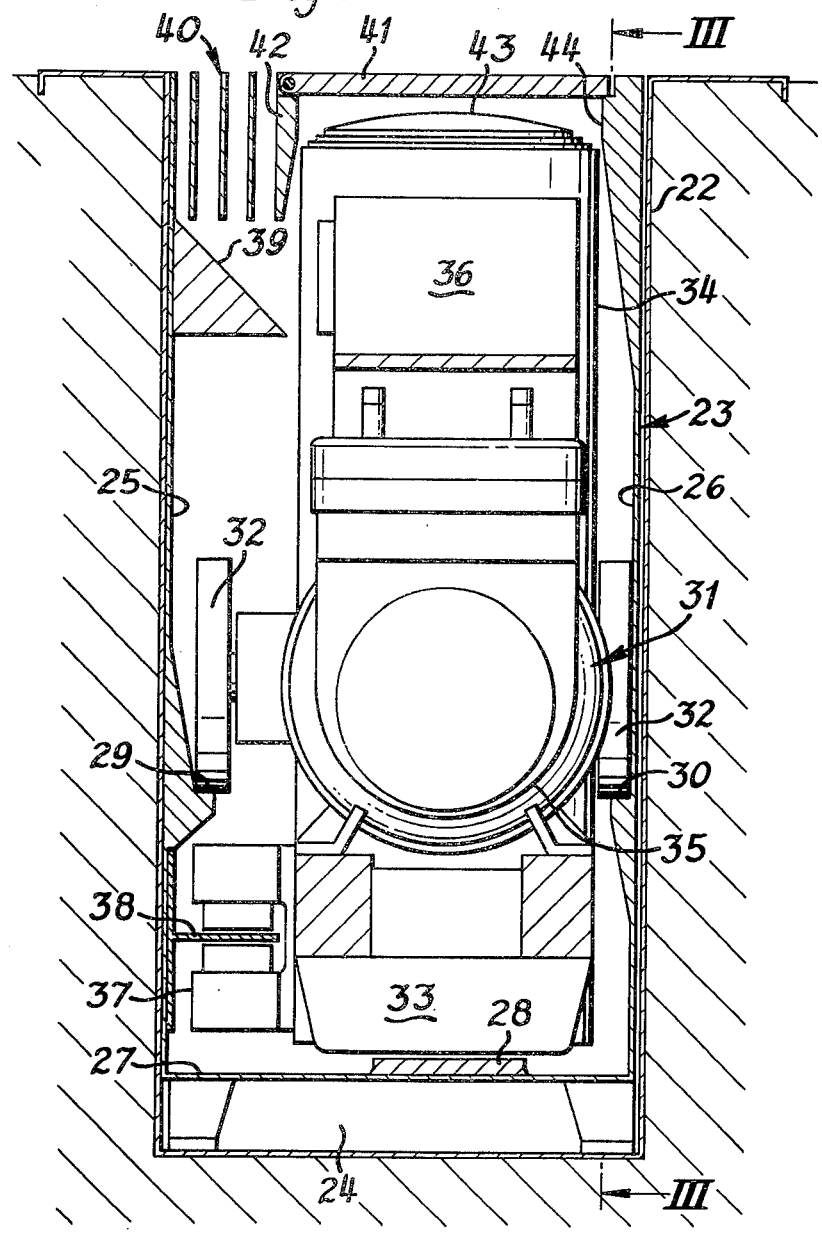

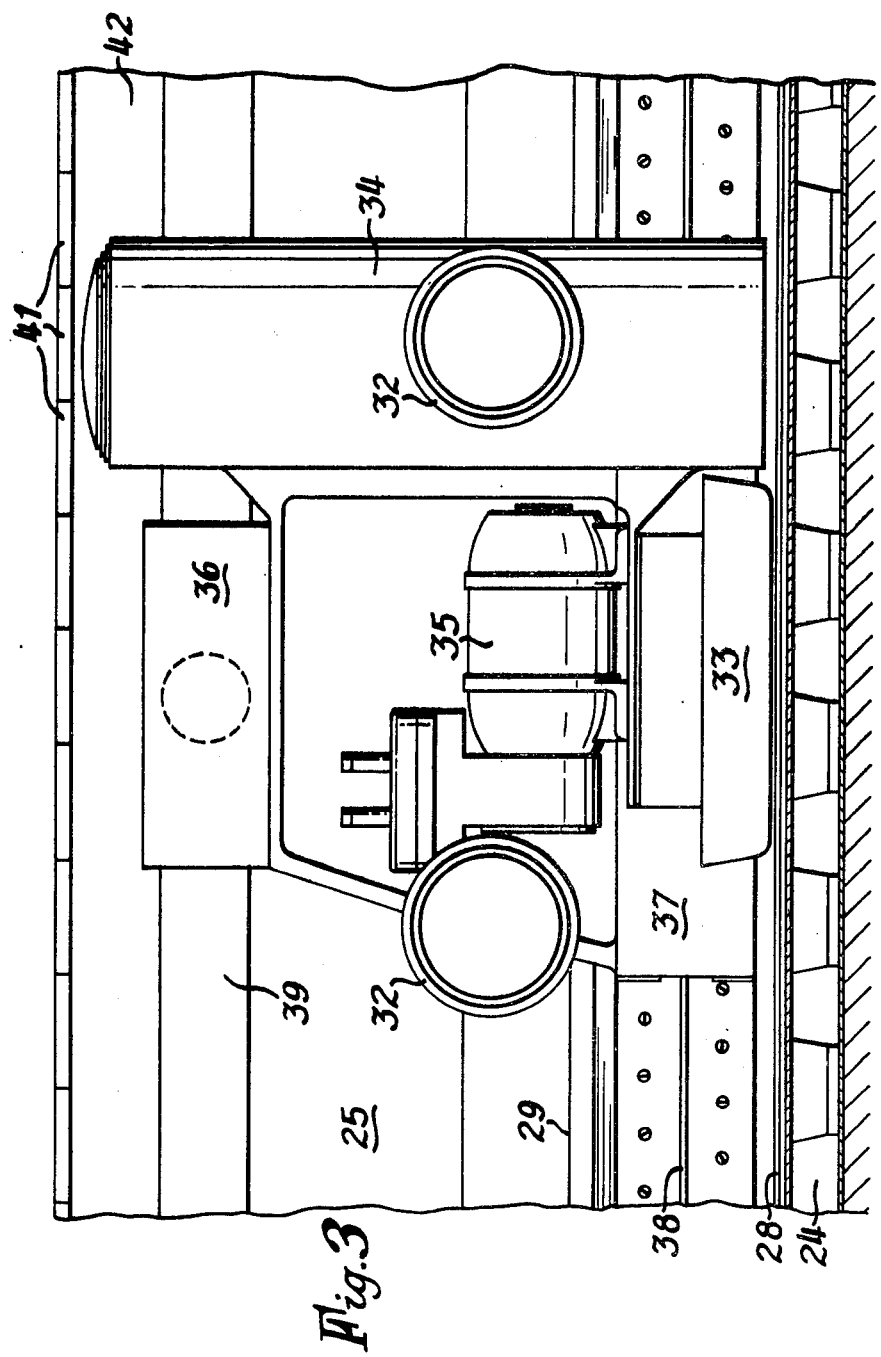

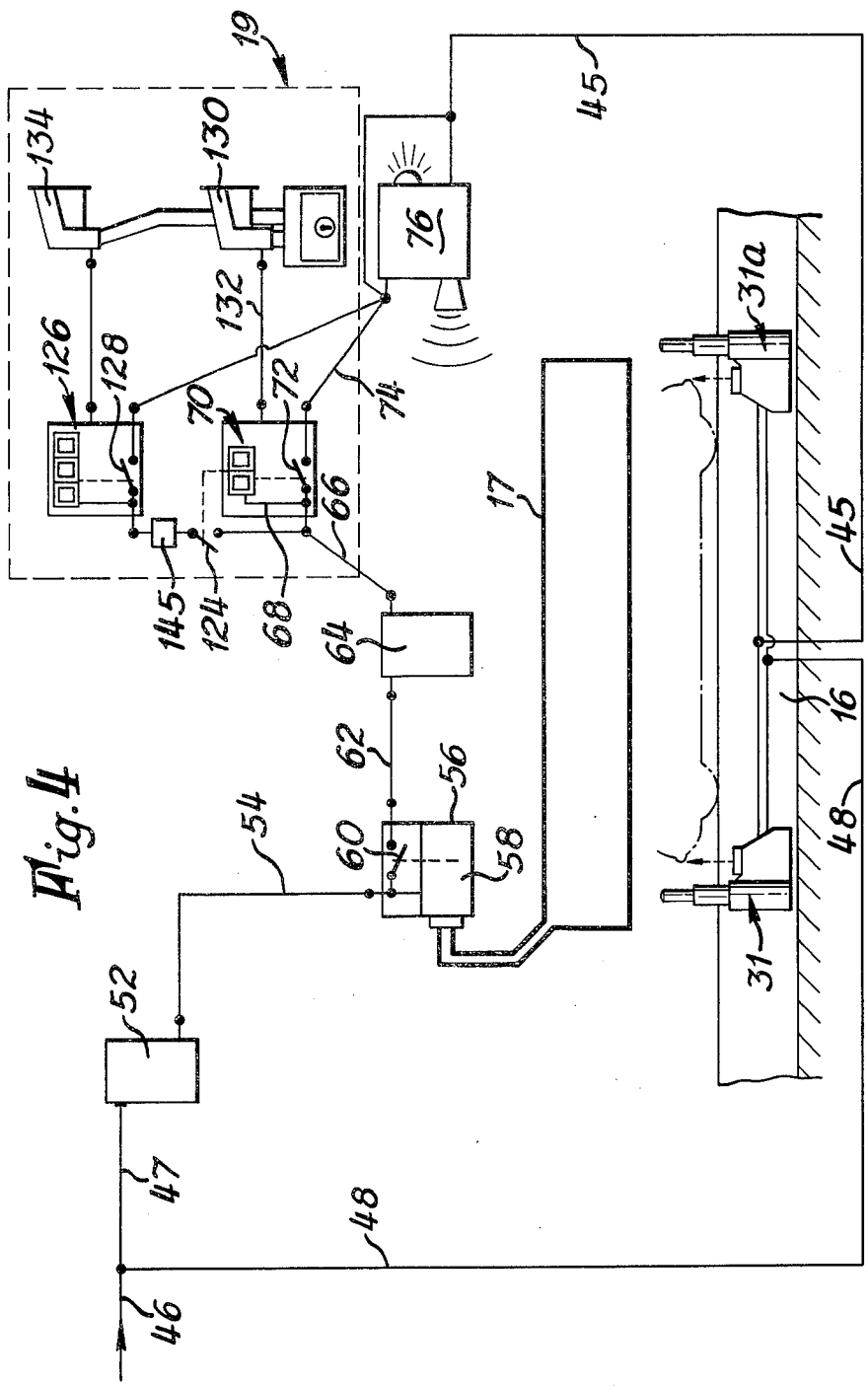

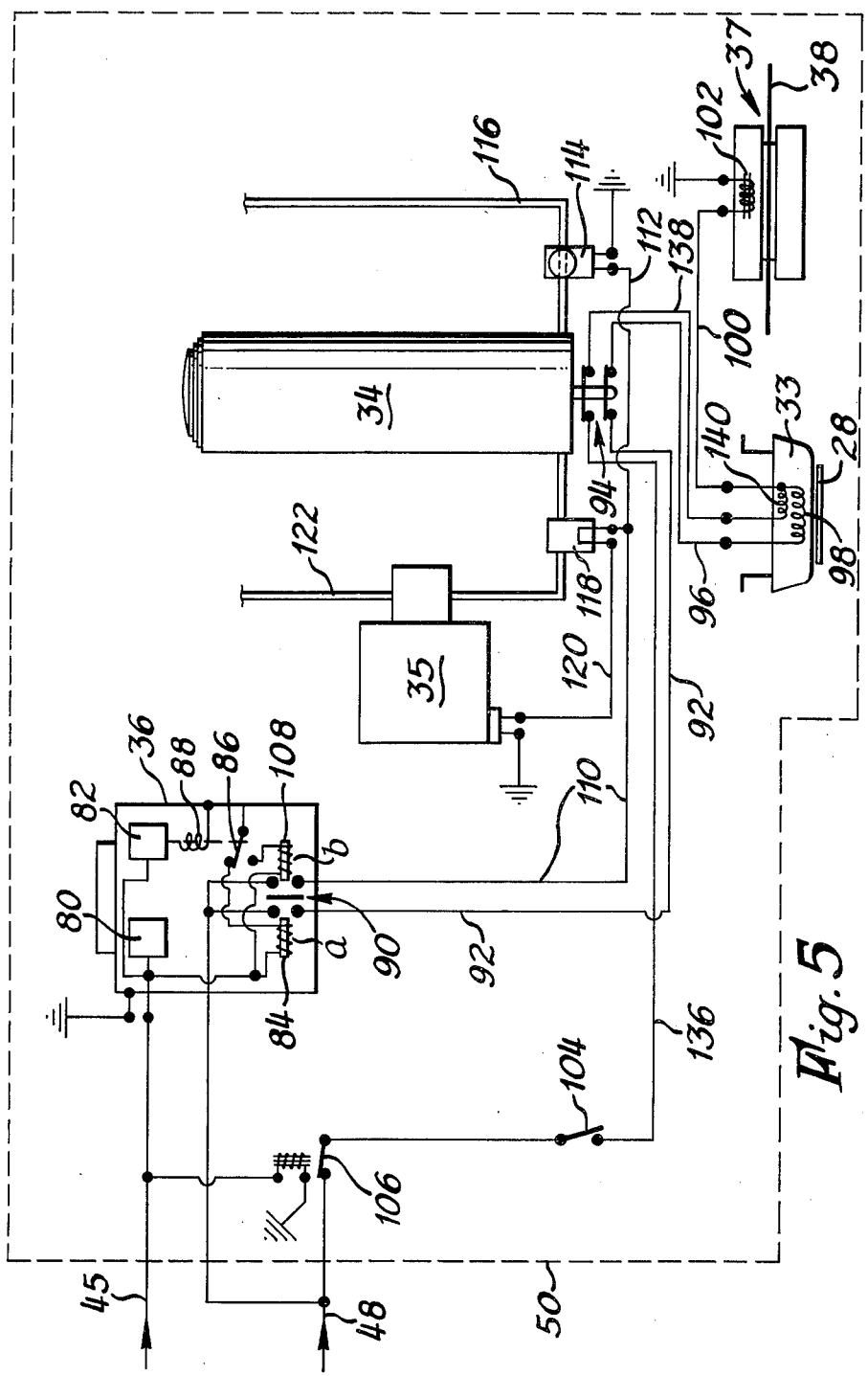

AUTOMATICALLY OPERATED VEHICLE RESTRAINT MECHANISM

BACKGROUND TO THE INVENTION

This invention relates to an automatically operated vehicle restraint mechanism for use in levying a charge for parking a vehicle in a parking bay, particularly but not exclusively a curbside parking bay.

Metered parking systems of the type presently in use suffer from a number of disadvantages. Many of the present systems are based upon prepayment of at least a minimum parking fee, with allowance of a corresponding parking time. The lack of the appropriate coins to prepay for parking time is a frequent source of annoyance to users of the system. Further, under this system it is essential to provide supervision to check for use of metered spaces without prepaying, and for overstaying of the prepaid period. Upon detection of unauthorised use of a metered parking space, it is then necessary to undertake a complex operation, which may involve legal action, to fine the person responsible.

Systems for raising barriers to confine a vehicle within a defined parking space until payment of a fee required for use of that space have been suggested, particularly in off-street parking systems. However, none of them is completely satisfactory for use in curbside parking since the barriers, and the mechanism for operating them, form an unacceptable obstruction in the roadway, even when the barriers are not raised to the operative position. Furthermore, known curbside parking systems involve the co-operation of the driver of the vehicle to the extent that the vehicle must be parked in a specific position in the parking bay for the barriers to operate and restrain the vehicle effectively. As a result it is possible for the driver to park without payment or to damage the mechanism if he does not park in exactly the right position in the bay.

U.S. Pat. No. 3503480 of Clark L. Selby Jnr., discloses a method and means of self enforced parking in which the presence of a vehicle in the parking bay is sensed and a barrier automatically raised behind the vehicle. The vehicle is trapped between the barrier and parking curb and can only be removed by inserting coins into a meter which automatically causes the barrier to retract. The Selby system has a number of disadvantages. The sensing means is pressure operated and therefore requires the co-operation of the motorist. The sensing device is only actuated if a wheel of the vehicle is positioned directly on it and consequently if the driver does not park in exactly the right position the system does not function effectively. In addition, the barrier means is designed to trap the wheel or wheels of the vehicle and if the vehicle is not in exactly the correct position the barrier means will not trap the wheel effectively. Finally, the barrier which traps the wheel is relatively low and a vehicle could be forcibly driven out of the barrier if the driver was determined to evade the payment of a parking fee. For these reasons the known system disclosed in the Selby specification is unsatisfactory as a curbside parking system.

U.S. Pat. No. 2627920 of Wallace Dudley Barlow also discloses an automatic curbside parking system which traps a vehicle automatically and which is automatically released upon insertion of a parking fee into a meter. The Barlow system incorporates a mechanical sensor in the form of a feeler which projects upwardly from the ground and which is deflected by a vehicle entering the parking bay. This feeler forms a permanent obstruction in the parking bay and therefore renders the system unacceptable for use in a curbside parking bay. The use of a mechanical feeler also involves the co-operation of the driver of the vehicle, to the extent that the vehicle must be driven over the feeler in order to actuate the system.

In addition to the above described disadvantages which are inherent in the Selby and the Barlow systems, neither of these known parking system has provision for automatically collecting parking fees at a higher rate when an initial parking period has expired.

OBJECTS OF THE INVENTION

It is an object of the present invention to provide an automatically operated vehicle restraint mechanism which overcomes, or substantially reduces the problems associated with the known systems, by providing a mechanism which automatically senses the presence of a vehicle in a parking bay, regardless of the position of the vehicle in the bay, automatically moves a restraint system into position to prevent the vehicle from being driven away from the parking bay and automatically releases the vehicle to enable it to be driven away only when an appropriate parking fee and/or any other incurred penalty has been paid by inserting coins or tokens into a parking meter associated with the parking bay, thus preventing "meter feeding" the unauthorised use of unexpired time on the meter and involving a minimum of supervision.

STATEMENT OF THE INVENTION

The present invention provides an automatically operated vehicle restraint mechanism comprising sensing means adapted to sense the presence of a vehicle in a parking position, vehicle restraint means which is movable between an operative position in which movement of the vehicle from the parking position is restrained thereby and an inoperative position in which the vehicle can be moved away from the parking position, the sensing means being adapted to initiate movement of the restraint means from the inoperative position into the operative position in response to the presence of a vehicle in the parking position and a metering mechanism adapted to time the presence of a vehicle in the parking position and initiate movement of the restraint means into the inoperative position in response to a signal applied to the metering mechanism.

Preferably, the vehicle restraint means comprises two restraint members located below ground level in the inoperative position and movable horizontally towards the opposite ends of a vehicle in the parking position and vertically so as to restrain the vehicle therebetween.

Each restraint member is preferably associated with a sensor adapted to sense the distance between the restraint member and the adjacent end of the vehicle and stop horizontal movement of the restraint member a predetermined distance from the vehicle.

In a preferred form of the invention each restraint member comprises a vertically extensible post mounted on a horizontally movable trolley located in a trough below ground level, forward movement of the trolley from an end of the trough towards a vehicle being initiated by the sensing means and reverse movement of the trolley away from the vehicle being initiated by the metering mechanism.

Preferably also, the metering mechanism includes a timer which is adapted to count the time that a vehicle remains in the parking position after it has been sensed by the sensing means and to initiate movement of the restraint means into the inoperative position when the timer is returned to zero.

DESCRIPTION OF THE DRAWINGS

FIG. 1 is a diagrammatic plan view of a curbside parking bay incorporating the vehicle restraint mechanism of the present invention.

FIG. 2 is a section taken on the line II — II of FIG. 1 showing a trolley which forms a part of the vehicle restraint mechanism in end view.

FIG. 3 is a section taken on the line III — III of FIG. 2.

FIG. 4 is a block diagram of the control circuit of the vehicle restraint mechanism shown in FIGS. 1 to 3 and, FIG. 5 is a more detailed diagram of a part of the control circuit in FIG. 4.

DESCRIPTION OF THE PREFERRED EMBODIMENT

In FIG. 1 of the drawings an automatically operated vehicle restraint mechanism 10 is shown installed in a curbside parking bay 11 which is defined by lines 12 painted on the road surface 13 and extending outwardly from a curb 14 of a pavement 15.

In the illustrated embodiment of the invention the parking bays 11, 11a, 11b are shown aligned in parallel with the curb, but this is not essential and the vehicle restraint mechanism 10 can be incorporated in a parking bay which extends outwardly at right angles, or at an inclined angle, to the curb to provide "echelon" parking.

A trough 16 extends continuously through the bays 11, 11a, 11b in parallel with the curb 14 and a little further from the curb than the median line of the bays. Positioned adjacent the trough 16 and between the trough 16 and the curb 14 is a vehicle sensor which comprises a magnetic loop 17. The loop 17 is buried just beneath the road surface and is electrically connected by a cable 18, which is also buried, to a metering mechanism 19. The metering mechanism 19 is housed in a meter which is mounted on a post positioned on the pavement 15 adjacent the curb 14 at one end of the bay 11. Both the meter and the meter post are formed from hardened steel, to ensure that they cannot be easily damaged and the visual display unit in the meter is protected by a toughened glass or laminated plastics.

The trough 16 which is shown in detail in FIG. 2 is connected by a pipe 20 to a drain 21 so that rainwater can drain freely from the trough and comprises an outer channel 22 and an inner channel 23 which fits within the outer channel 22 leaving a drainage gap 24 at the bottom connected via the pipe 20 to the drain 21.

The inner channel 23 extends the length of the bay 11 and comprises vertical sidewalls 25, 26 and a flat base 27 carrying a rail 28 which forms part of a linear induction motor. Guide rails 29 and 30 are provided on the sidewalls 25, 26 of the inner channel and two similar trolleys 31 and 31a are mounted on rollers 32, which run on the guide rails 29 and 30 so as to be movable along the length of the trough. The two trolleys 31 and 31a are similar and therefore only the trolley 31 will be described in detail.

The trolley 31 is driven by a linear induction motor 33, which is located adjacent the rail 28 and which is adapted to drive the trolley in either direction along the trough. Mounted on the trolley 31 are a vertically extensible telescopic post 34, made of a material such as hardened steel or laminated plastics which is actuated by an air pump 35, and an ultrasonic sensing device 36. An electrically releasable brake 37 is provided on one side of the trolley for clamping engagement on a continuous brake plate 38, which projects from the sidewall 25 of the inner channel 23. It will be seen from FIG. 3 that the brake 38 runs the full length of the trolley.

The ultrasonic sensing device 36 is mounted forwardly of the post 34, that is on the side of the post facing the other trolley 31a and comprises a transmitter adapted to emit an ultrasonic beam horizontally onto a reflector 39 and a receiver adapted to receive a beam reflected back via the reflector 39. The reflector 39 extends along the length of the channel 23 and directs the sensing beam vertically upwardly through a grille 40 which also extends the full length of the channel 23.

The upper end of the channel 23, between the grille 40 and the sidewall 26 is closed by a row of hinged flaps 41, each of which is biassed into the closed position, and which is hinged onto a side flange 42 of the grille 40. The flaps 41 are positioned above the path of travel of the post 34 and are hinged upwardly by the post when the post is extended. The width of each flap is slightly less than half the diameter of the post so that the post will always engage and lift three flaps as it extends. The post 34 has a part spherical cap 43 and is a conventional, sealed telescopically extensible post. Adjacent to the upper end of the channel 23, the sidewall 26 is inclined inwardly at 44 so that when the post is raised, it is closely supported at ground level by the inclined sidewall 44, the flange 42 and the adjacent flaps 41. The bottom end of the post is rigidly mounted on the trolley 31 and the trolley 31 is clamped by the brake 37 onto the brake plate 38 when the post is in the raised position. Since the brake extends the full length of the trolley, a triangulation effect is achieved giving the post great stability and making the post highly resistant to knocks applied in the direction of the trough.

The trolleys 31 and 31a are connected to the metering mechanism by an electrical cable 45, which is buried, and are also connected to a mains current supply for a purpose to be described below. A brief description of the general manner of operation of the system will be given before its detailed operation is explained with reference to FIGS. 4 and 5.

Normally, the trolleys 31 and 31a will be at opposite ends of the trough 16 with the posts 34 in the fully retracted rest position and all of the flaps 41 down so that the road surface is completely uninterrupted and can be used in the normal way.

The arrival of a vehicle on the parking bay 11 is sensed by the loop 17 regardless of the position of the vehicle in the bay. This provides a signal which, after a brief delay, causes a timer in the metering mechanism 19 to begin timing the parking period, and causes the trolleys 31 and 31a to start approaching the vehicle from opposite ends, with their posts 34 still retracted. As the linear motors 33 will cause the trolleys to accelerate, a conventional speed govenor is built into the axle of one of the pairs of rollers 32 to ensure that each trolley traverses at a steady speed towards the vehicle.

When the sensing devices 36 on the trolleys sense the opposite extremities of the vehicle, the trolleys are automatically stopped and the posts 34 are extended upwards close to each end of the vehicle so that the vehicle is effectively restrained between the posts and cannot be driven away. The vehicle can then only be released by inserting into the meter mechanism 19 sufficient coins or tokens to pay for the appropriate number of accumulated parking periods. Insertion of the correct coins or tokens automatically causes the posts to retract so that the vehicle can be driven away, and the trolleys then move back to their original starting positions.

The operation of the system will now be described in more detail with reference to FIGS. 4 and 5.

FIG. 4 shows the electrical components of the whole system, fed from a buried single phase mains supply line 46. A line 47 supplies power from the mains supply line 46 for the metering mechanism 19, shown within a broken line and the control circuitry which is located with it on the pavement. A further line 48 provides a mains voltage supply from the line 46 to the trolleys 31 and 31a located in the trough 16 in the road. A line 45, previously referred to, carries control signals from the control circuitry on the pavement to each of the trolleys in the trough 16, through an electrical cable, not shown, which extends as the trolley moves away from the end of the trough and automatically retracts as the trolley returns towards the end of the trough.

The electrical connection of lines 45 and 48 to the equipment carried by one of the trolleys is shown in FIG. 5, the equipment actually mounted on the trolley being shown within the broken line 50. Both the trolleys are the same, and they operate in the same way but in opposing directions.

Referring to FIG. 4, an inverter 52 provides, from the alternating mains voltage, a lower DC voltage on line 54 for operating the control circuitry. Line 54 leads to a control unit 56 for the loop 17. Control unit 56 includes an oscillator and sensor section 58 which provides an oscillatory voltage to the inductive loop 17. The inductive coupling produced by locating a metal vehicle over the loop 17 changes the impedance of the loop and this change of impedance is sensed by suitable conventional circuitry in section 58 which, in response to the change, closes a solenoid operated switch 60. This applies the voltage from line 54 via line 62 to a delay circuit 64.

The delay circuit 64 is set to provide a time lapse before any further operation takes place, to allow for the driver of the vehicle to change his mind and move off or to allow a limited free parking time period. The delay time can be readily adjusted to allow for changes in the requirements of the local authorities, for instance on some days a free parking period may be allowed, on others none. When the permitted delay has elapsed the delay circuit 64 applies a voltage via lines 66 and 68 to a first timer indicated at 70, which then starts timing. The timer 70 is provided with a conventional visual display as shown, and is arranged so as to close a switch 72 as soon as the display changes from zero.

When switch 72 is thus closed, voltage is applied on line 74 to a visual and audible warning device 76 the purpose of which is to give a warning that the vehicle restraint means is about to come into operation. Warning device 76 operates for a predetermined period a little longer than the period needed for the trolleys 31 and 31a to move to their restraining positions and for the posts 34 to be fully erected to restrain the vehicle.

The signal from line 74 is also transmitted via line 45 to both of the trolleys, to initiate their operation.

Referring now to FIG. 5, all the switches on and associated with each trolley are shown in that Figure in the positions which they occupy when the trolley is in its rest position at the end of the trough, with its post 34 retracted, and with no signal being received on line 45.

Receipt of a signal on line 45 causes the sensor 36 on each trolley to be activated and the motor 33 to be energized in the forward direction so that the trolley starts to move along the trough towards the vehicle with its sensor 36 operating. In more detail, the signal on line 45 energizes an ultrasonic transmitter 80 and an ultrasonic receiver 82 in the sensor 36. Transmitter 80 produces the beam of ultrasonic radiation which is reflected from reflector 49 and passes upwards through grille 40. Receiver 82 does not receive any reflected ultrasonic radiation until the sensor reaches the end of the vehicle and consequently does not produce any output signal until that time. The receiver 82 is gated, in a well known manner, to produce an output signal only when the ultrasonic radiation is reflected from a mass positioned within predetermined length limits above ground, for instance within 2 feet of the minimum height of a vehicle above ground level, to ensure that the receiver does not react to an object such as a large stone positioned over the grille whether accidentally or in a deliberate attempt to activate the mechanism. The receiver 82 is also gated to ensure that it does not react to rain or hail.

The signal from line 45 also energizes a coil 84, current flowing through the coil and a switch contact 86 to ground. Contact 86 is normally in the position shown in FIG. 5 but can be switched to the opposite position by energization of a coil 88 by means of the output signal which will be received from the ultrasonic receiver 82. Energization of coil 84 pulls contact 90 of a three-position switch from its central position, to which it is normally biased, to position a where it completes a circuit through line 92, normally closed switch 94, line 96, the forward run winding 98 of motor 33, line 100 and the operating coil 102 of brake 37 to ground. Thus, each trolley motor 33 is energized to drive the trolley forward and the brake 37 is simultaneously released by energization of coil 102, to permit such forward drive.

The switch 104 is a limit switch which brakes a reverse drive circuit of the motor when the trolley is moving back to its rest position at the end of a sequence of operations. Switch 104 is closed as soon as the trolley moves forward at the beginning of the sequence of operations but at the same time a solenoid operated switch 106 is opened in response to the signal received on line 45, which ensures that the reverse run circuit of the motor stays open.

The trolleys now move forward towards the vehicle with their ultrasonic sensors operating. As soon as the sensor arrives below the extremity of the vehicle, which is the position illustrated in FIG. 4, the ultrasonic receiver 82 receives radiation reflected from the vehicle and produces an output signal which energizes coil 88 which in turn switches contact 86 to the lower position. This de-energizes coil 84 and energizes a coil 108 which pulls contact 90 to its position b. This brakes the forward run circuit so that the motor 33 and brake 37 of the trolley become de-energized and consequently forward drive stops and the brake clamps onto plate 38 to hold the trolley in the position which it has reached.

The change-over of contact 90 to position b completes a circuit through line 110, line 112 and an electrically-operated exhaust valve 114 to ground. Valve 114 is in an exhaust pipe 116 from the air operated post mechanism 34. Valve 114 is normally open but is closed upon energization, so that the post 34 can now be pressurized.

A circuit is also completed from line 110 through a normally closed pressure-sensitive switch 118, line 120 and the motor of the air pump 35 to ground. This causes the air pump to start pumping air into the posts 34, the air being drawn in through an inlet pipe 122. This causes the post to start rising and, as it does so, it opens the double switch 94 to ensure that the motor 33 and brake 37 remain de-energized whenever the post is up or partially up, so that the trolley must remain locked in position.

The post of each trolley reaches a fully extended position and thereafter the pressure reaches a level sufficient to open pressure-sensitive switch 118 and hence stop the air pump. Should the pressure in the post fall sufficiently, for any reason, the switch 118 will re-close and the air pump 35 will operate again to bring the pressure up to the required level.

Once the above sequence has occured in respect of both the trolleys, the vehicle will be restrained by the fully extended posts 34 immediately in front of and behind it, as illustrated in FIG. 4. As can be seen from FIG. 3, the sensing device 36 on each trolley is mounted forwardly of the post 34 and the distance between the sensing device 36 and the post 34 is calculated to ensure that the post 34 will rise in a position closely adjacent the end of the vehicle and preferably within 4 inches from the end of the vehicle. This ensures that the vehicle cannot be manoeuvred out of the bay once the posts are raised and also that only a relatively small momentum can be generated if an attempt is made to knock the posts down by driving the vehicle at them.

If an attempt is made to 'deceive' the system for example if a vehicle is parked with a rear-opening door in the open or down position, so that the post rises adjacent to the door and the driver then closes the door leaving sufficient room between the extended post and the rear of the vehicle which might enable the vehicle to be manoeuvred out from between the posts, the post immediately retracts, moves forward and rises again adjacent to the end of the vehicle. The sensor 36 remains in operation so long as a signal is present on line 45 and so, as soon as the boot lid is raised, the signal from ultrasonic receiver 82 ceases, contact 86 is changed to the upper position and contact 90 goes back to the a position. This deenergizes the air pump circuit and the exhaust valve 114, so that the latter opens and the post sinks as its air is exhausted through pipe 116. When the post reaches the fully retracted position the double switch 94 is closed which completes the forward run circuit previously described so that brake 37 is released and motor 33 drives the trolley forwards again until the ultrasonic receiver 82 again receives reflected radiation, which will occur when the sensor has moved up to the rear of the vehicle, at which point the trolley automatically becomes locked and the post 34 is extended in the manner which has already been described.

Once the vehicle has been restrained by the posts, the system remains in its existing condition while the timer 70 continues timing. Timer 70 is arranged to close a switch 124 once it has timed a predetermined number of units of time, which number of time units represent a maximum normal parking period at the parking space concerned. The number of units of time recorded by timer 70 before switch 124 is closed is predetermined but can be readily changed to suit local conditions in the area in which the parking bay is situated. Closure of switch 124 when this period of time has elapsed initiates operation of a similar timer 126 which then starts timing the 'excess' units of time for which the vehicle remains on the parking space. When timer 126 has started, it closes a switch 128 which establishes a second circuit from line 66 to line 45, in parallel with the first circuit through switch 72, so that it will be essential for both timers to be reset to zero by insertion of the appropriate coins or tokens before the signal on line 45 can be removed to enable the vehicle to be released.

When it is desired to release the vehicle coins are inserted into a coin receiving mechanism 130 of known kind which is adapted to reject all but the correct coins or tokens and which for each correct coin or token inserted, produces a signal on line 132. The timer 70 responds to each such signal by stepping back by a predetermined amount, for instance one unit of time for each signal. Once the number of coins or tokens required to step the timer back to zero have been inserted, switch 72 will be opened and, if the vehicle has not been left into 'excess' time, the signal on line 45 will be removed. If the vehicle is in 'excess' time, then timer 126 will also have been in operation and switch 128 will have been closed. In these circumstances, sufficient further coins or tokens will have to be inserted in a coin receptor 134 to cause excess timer 126 to step back to zero also, thus opening switch 128, which would otherwise have maintained the signal on line 45.

The insertion of a coin or token into coin receptor 130 automatically closes switch 124, if this has not already been closed, so that any attempt to 'feed the meter' before the meter switches over to excess time causes an immediate switch to excess time and is thus immediately penalized.

Referring now to FIG. 5, removal of the signal from line 45 by returning both timers 70 and 126 to zero de-energizes ultrasonic transmitter 80 and coil 108 and in consequence contacts 86 and 90 return to the positions shown in FIG. 5. This de-energizes the exhaust valve 114 on each trolley and the air pump motor so that the posts sink under gravity or some other bias, exhausting air through pipe 116. When each post reaches the fully retracted position the double switch 94 becomes closed. However, it does not complete the forward run circuit of each motor 33 because contact 90 is in its central neutral position, which keeps the forward run circuit open. On the other hand, removal of the signal from line 45 causes closure of the solenoid operated switch 106. Limit switch 104 is already closed, since it is closed whenever the trolley is not in its rest position. Consequently, closure of switch 106 completes a reverse run circuit from the mains supply line 48 via line 136, the upper contact of the switch 94, line 138, reverse run winding 140 of motor 33, and the operating coil 102 of brake 37 to ground. This releases the brake 37 and energizes motor 33 in the reverse direction so that with its post retracted each trolley moves back from the vehicle towards its rest position. When it reaches the rest position it opens limit switch 104 which brakes the reverse run circuit, so that the trolley stops and the brake 37 clamps the trolley in its rest position. All the components associated with each trolley have thus been returned to their initial condition, as illustrated in FIG. 5, the same sequence of events occurring for both trolleys.

The vehicle can now be driven off the parking space and when it moves off the inductive loop 17 the circuitry 58 will sense the change of impedance and in response open the switch 60, cutting off the power supply to the metering mechanism and returning the equipment to the condition shown in FIG. 4.

When both the timers 70 and 126 are returned to zero, the switch 124 is automatically held in the closed position and the circuit to the timer 70 is opened. At the same time a delay mechanism 145, is actuated which delays actuation of the timer 126 for a period equal to the time required for the posts to retract and for a driver to clear the parking bay. If the parking bay is cleared then the switch 60 is opened, the switch 124 is opened, the delay mechanism 145 associated with the timer 126 is reset and the circuit to the timer 70 is closed. If however, the vehicle remains on the bay, the switch 60 remains closed and after the lapse of the predetermined time delay the timer 126 is actuated and the switch 128 is closed, completing the circuit to line 45. The posts will then rise restraining the vehicle and time will accumulate only on the excess timer 126. Any attempt to feed the meter in this way is therefore automatically penalized.

If any attempt is made to break or damage the posts in order to move a vehicle from the bay, it will be noted that the vehicle is never more than about 4 inches from a post and therefore cannot generate any real momentum. In addition, the maximum resistance and stability of the post is in a line along the length of the trough, the direction of the brake 37 and this is the direction in which a vehicle would be driven at the post. As a result the posts 34 cannot be knocked down easily by a trapped vehicle.

The metering mechanism 19 can be designed, to include any number of additional timers each of which must be freed by the insertion of coins or tokens before a vehicle is released from the parking bay so as to provide for the charging of several different rates depending upon the time which has elapsed. Alternatively the excess time counter can be omitted if all that is required is a flat rate parking charge which does not alter in dependence upon the length of time that the vehicle is parked in the bay. It is also envisaged that the metering mechanism 19 can be modified so that the timers are automatically returned to zero upon the insertion of a credit card. Thus a person holding a parking season ticket or other persons such as invalids holding a card would simply insert the card into the meter which would automatically return the counters to zero and initiate the movement of the restraint means into the inoperative position. The metering mechanism 19 can be modified so as to automatically record on the card the length of time that the vehicle has been parked in the bay. The parking fees due can then be calculated from the card at appropriate intervals, eliminating the necessity to feed coins or tokens into the meter. Alternatively the metering mechanism can be designed to record the time periods and the card number so that a permanent record is provided in the metering mechanism of the time parked on the identity of the user of the bay.

The trough 16 can extend, as shown, throughout the length of a number of adjacent parking bays 11, 11a, 11b or alternatively a separate trough can be provided in each parking bay which terminates short of the end of the parking bay. In either case, the control circuits for a row of parking bays are preferably linked together so that all of the bays can be rendered temporarily inoperative by switching off the mains power source to the row of bays. If the bay is arranged at right-angles to the curb then a separate trough is provided for each bay and preferably the trough extends outwardly from the curb, beyond the length of the bay to ensure that a vehicle parking partly out of the bay can be effectively trapped and restrained by the outer post.

If a trough is provided which extends throughout the length of a number of adjacent bays, then the control circuit can be modified to ensure that, if a vehicle parks incorrectly so that one end of the vehicle extends beyond the end of a bay, the trolley which is positioned beneath the end of the vehicle will initially go into reverse until it senses the end of the vehicle. The trolley will then move in a reverse direction out of its own bay, pushing the adjacent trolley from the next bay ahead of it.

In the embodiment of the invention described herein, a vehicle is trapped in the parking bay by two posts one positioned at each end of the vehicle, which are movable towards and away from each other in a direction parallel with the length of the parking bay. In certain applications it can be desirable to provide a further post positioned adjacent the side of the vehicle remote from the curb. Preferably, this further post is mounted on a trolley, similar to the trolleys 31, 31a and movable in a trough located at right-angles to the trough 16. However, it is also envisaged that this further post can be positionally fixed on the boundary of the parking bay and movable only in a vertical direction, being retracted below ground level in the inoperative state and extended upwardly in the operative state. In either case, the further post is operable in the same manner as the posts 34 on trolleys 31, 31a and controlled in the same way.

It will be understood that many minor modifications can be made to the specific embodiment of vehicle restraint mechanism described and shown. For instance, the means for driving and guiding the trolleys can be modified and the posts can be hydraulically or electrically extended. It will be seen however that the vehicle restraint mechanism of the present invention provides a metered parking system which enables payment to be made at the end of the parking.

What we claim is:

1. An automatically operated vehicle restraint mechanism for parking bays of determined orientation, said mechanism comprising sensing means actuated by the presence of any portion of a vehicle that is parked at least generally in such orientation and with such portion in any position in the parking bay, vehicle restraint means movable between an inoperative position in which movement of the vehicle into and out of the parking bay is not restrained by the restraint means and an operative position in which the movement of the vehicle out of the parking bay is restrained by the restraint means, a metering mechanism actuated by the sensing means for timing the presence of such portion of such vehicle in the parking bay, means actuated by the sensing means for moving the restraint means from the inoperative position to the operative position, means for de-activating said metering mechanism when it is desired to terminate the period of vehicle restraint, and means responsive to the de-activation of said metering mechanism for moving said restraint means from operative position to inoperative position.

2. An automatically operated vehicle restraint mechanism comprising a primary vehicle sensor located below ground level in a parking bay and adapted to sense the presence of a vehicle parked above it, vehicle restraint means comprising two restraint members electrically connected to the primary vehicle sensor and movable in response to an electric signal initiated from the primary vehicle sensor from an inoperative position in which they are located below ground level into an operative position in which they are located above ground level and closely adjacent opposite ends of the vehicle so as to restrain the vehicle and prevent it from being driven away from the parking bay and a metering mechanism electrically connected to the primary vehicle sensor and to the vehicle restraint means, the metering mechanism including a timer which is actuable by a signal from the primary vehicle sensor to time and record the presence of a vehicle over the vehicle sensor and which is returnable to zero, the vehicle restraint means being movable from the operative position to the inoperative position in response to a signal initiated from the metering mechanism when the timer is returned to zero.

3. An automatically operated vehicle restraint mechanism comprising sensing means adapted to sense the presence of a vehicle parked in any position in a parking bay, vehicle restraint means movable between an operative position in which movement of the vehicle away from the parking bay is effectively restrained by the restraint means and an inoperative position in which the vehicle can be moved away from the parking bay and a metering mechanism adapted to time the presence of a vehicle in the parking position, the sensing means being adapted to initiate movement of the restraint means from the inoperative position into the operative position in response to the presence of a vehicle parked in any position in the parking bay and the metering mechanism being adopted to initiate movement of the restraint means into the inoperative position in response to a signal applied to the metering mechanism, wherein the vehicle restraint means comprises two restraint members located below ground level in the inoperative position and movable horizontally towards the opposite ends of a vehicle in the parking bay and vertically into the operative position so as to restrain the vehicle therebetween.

4. A vehicle restraint mechanism as claimed in claim 3, wherein each restraint member is associated with a sensor adapted to sense the distance between the restraint member and the adjacent end of the vehicle and stop horizontal movement of the restraint member a predetermined distance from the vehicle.

5. A vehicle restraint mechanism as claimed in claim 4, wherein each restraint member comprises a vertically extensible post mounted on a horizontally movable trolley located in a trough below ground level, forward movement of the trolley from an end of the trough towards a vehicle being initiated by the sensing means and reverse movement of the trolley away from the vehicle being initiated by the release mechanism in response to the said signal.

6. A vehicle restraint mechanism as claimed in claim 5 wherein each sensor comprises a transmitter adapted to generate a sensing beam and a receiver adapted to sense reflections of the sensing beam, thereby sensing the position of the trolley relative to the parked vehicle during movement of the trolley towards the parked vehicle, and initiating a signal to stop the trolley at a predetermined distance from the vehicle and initiate upward extension of the post.

7. A vehicle restraint mechanism as claimed in claim 6, wherein downward movement of the or each post is initiated by the metering mechanism in response to the said given signal and reverse movement of the trolley away from the parked vehicle is actuated by switch means associated with the post when the post is fully depressed.

8. A vehicle restraint mechanism as claimed in claim 7 wherein the trough is at least partially closed by a plurality of hinged shutters which are automatically opened by each post as the post rises above ground level and which are normally closed and flush with the ground surface.

9. A vehicle restraint mechanism as claimed in claim 8, wherein the trough is partially covered by a grating extending lengthwise of the trough in register with the path of travel of the sensing beam of the sensor associated with the or each post.

10. A vehicle restraint mechanism as claimed in claim 9, wherein the sensing means comprises a magnetic loop located below ground level.

11. A vehicle restraint mechanism as claimed in claim 10, wherein the metering mechanism includes a timer which is adapted to count the time that a vehicle remains in the parking bay after it has been sensed by the sensing means and to initiate the said movement of the restraint means into the inoperative position when the timer is returned to zero.

12. A vehicle restraint mechanism as claimed in claim 11, wherein the metering mechanism includes a coin receptor adapted to return the timer to zero in response to the insertion of release means into the coin receptor.

13. A vehicle restraint mechanism as claimed in claim 12, wherein the metering mechanism includes a second timer which is actuated when a given time period measured on the first timer has elapsed and a second coin receptor adapted to return the second timer to zero in response to insertion of release means into the second coin receptor, the arrangement being such that return movement of the restraint means into the inoperative position is initiated only when both the first and the second timers are returned to zero.

14. A vehicle restraint mechanism as claimed in claim 13, wherein the restraint means is automatically actuated and the second timer is reactivated when a predetermined delay has elapsed after the first and second timers have been returned to zero if the vehicle is not removed from the parking position.

15. A vehicle restraint mechanism as claimed in claim 14, wherein the metering mechanism is actuated by the sensing means when the sensing means senses the presence of a vehicle in the said parking bay.

16. A vehicle restraint mechanism as claimed in claim 15, wherein a delay mechanism is provided whereby a predetermined time delay occurs between the sensing means sensing a vehicle in the said parking bay and actuation of the metering mechanism and the restraint means.

17. A vehicle restraint mechanism as claimed in claim 16, wherein a warning mechanism is provided, the warning mechanism being actuated at the same time as the metering mechanism and being adapted to operate for a time approximately equal to the time taken for the restraint means to move from the inoperative to the operative position.

18. A vehicle restraint mechanism as claimed in claim 1, wherein the vehicle restraint means, the sensing means and the meering metering are electrically connected and the arrangement is such that the presence of a vehicle in the parking position generates an electrical signal from the sensing means which initiates movement of the restraint means into the operative position and actuates the metering mechanism which times and records the presence of the vehicle in the parking bay, the vehicle restraint means remaining in the operative position until reverse movement of the restraint means is initiated by an electrical signal from the metering mechanism.

19. A vehicle restraint mechanism as claimed in claim 2, wherein the metering mechanism includes a release mechanism and the timer can be returned to zero by inserting the appropriate release means into the release mechanism.

20. A vehicle restraint mechanism as claimed in claim 2, wherein the metering mechanism includes a second timer and a second release mechanism associated with the second timer, the second timer being automatically operable when the first timer has recorded a predetermined number of time periods and the vehicle restraint mechanism being movable from the operative position to the inoperative position in response to a signal initiated from the metering mechanism only when both timers are returned to zero.

21. A vehicle restraint mechanism as claimed in claim 20, wherein the metering mechanism includes a delay mechanism which is actuated when both timers are returned to zero and which activates the second timer and de-activates the first timer when a predetermined delay has elapsed.

22. A vehicle restraint mechanism as claimed in claim 21, wherein the delay mechanism and the timers are reset and de-activated in response to a signal initiated by the sensing means when the vehicle leaves the bay.

23. A vehicle restraint mechanism as claimed in claim 22, wherein the vehicle restraint means comprises at least two vertically extensible posts mounted on horizontally movable trolleys and each associated with a secondary sensor adapted to sense the distance of the post from a vehicle, the arrangement being such that the presence of a vehicle over the said primary sensor initiates forward movement of the trolleys from the boundaries of the parking bay towards the vehicle, movement of each trolley is stopped by a signal from the secondary sensor when the post is a predetermined distance from the vehicle and vertical extension of the posts is initiated when the trolleys stop.

24. A vehicle restraint mechanism as claimed in claim 19 wherein the restraint members comprise vertically extensible posts, each mounted on a horizontally movable trolly located in a trough below ground level, forward movement of each trolley from an end of the parking bay being initiated by the primary vehicle sensor and reverse movement of each trolley being initiated by the metering mechanism.

25. A vehicle restraint mechanism as claimed in claim 9 in which the trough extends beyond the boundary of the parking bay and each trolley is movable along the trough beyond the boundary of the parking bay.

* * * * *

UNITED STATES PATENT OFFICE
CERTIFICATE OF CORRECTION

PATENT NO. : 3,900,092
DATED : August 19, 1975
INVENTOR(S) : Frederick Walter Page et al It is certified that error appears in the above-identified patent and that said Letters Patent are hereby corrected as shown below:

Claim 18, line 16, "meering metering" should be "metering mechanism"

Claim 25, second line, "9" should be "19"

Signed and Sealed this sixth Day of April 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,900,092
DATED : August 19, 1975
INVENTOR(S) : Frederick Walter Page et al It is certified that error appears in the above-identified patent and that said Letters Patent are hereby corrected as shown below:

In the heading of the patent under the caption "Foreign Application Priority Data", the number "11638/73" should be-- 11639/73--and a second application should be listed as follows:

October 26, 1973  United Kingdom . . . . 50050/73

Signed and Sealed this sixteenth Day of August 1977

[SEAL]

Attest:

RUTH C. MASON
*Attesting Officer*

C. MARSHALL DANN
*Commissioner of Patents and Trademarks*